US009533676B2

(12) United States Patent
Kinoshita et al.

(10) Patent No.: US 9,533,676 B2
(45) Date of Patent: Jan. 3, 2017

(54) CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Gohki Kinoshita, Isehara (JP); Yoshihito Kanno, Numazu (JP); Hiroki Morita, Hiratsuka (JP); Daisuke Izuoka, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/137,495

(22) Filed: Apr. 25, 2016

(65) Prior Publication Data
US 2016/0318504 A1 Nov. 3, 2016

(30) Foreign Application Priority Data

Apr. 28, 2015 (JP) ................. 2015-091107

(51) Int. Cl.
*B60W 10/08* (2006.01)
*B60W 10/06* (2006.01)
(Continued)

(52) U.S. Cl.
CPC ............... *B60W 20/14* (2016.01); *B60K 6/24* (2013.01); *B60K 6/26* (2013.01); *B60K 6/365* (2013.01);
(Continued)

(58) Field of Classification Search
CPC ...... B01L 1/02; G21F 7/005; G21Y 2002/301; Y10S 292/33; Y10T 292/205; Y10T 292/225
(Continued)

(56) References Cited

U.S. PATENT DOCUMENTS 6,209,672 B1 * 4/2001 Severinsky ............ B60K 6/442
180/65.23
6,554,088 B2 * 4/2003 Severinsky ............ B60H 1/004
180/65.23
(Continued)

FOREIGN PATENT DOCUMENTS

JP 2000-083303 A 3/2000
JP 2004-203218 A 7/2004
(Continued)

OTHER PUBLICATIONS

Sen et al., Analysis of the Battery Performance in Hybrid Electric Vehicle for Different Traction Motors, 2009, IEEE, p. 1-6.*
(Continued)

*Primary Examiner* — McDieunel Marc
(74) *Attorney, Agent, or Firm* — Andrews Kurth Kenyon, LLP

(57) ABSTRACT

An electronic control unit included in a control system is configured to execute a change of a combustion mode in an inertia-phase period during a gear shift operation, or after the gear shift operation is completed, when a request for the change of the combustion mode and a request for a gear shift of the transmission mechanism overlap. The electronic control unit is configured to execute the change of the combustion mode in the inertia-phase period during the gear shift operation when conditions i) and ii) are established, and execute the change of the combustion mode after the gear shift operation is completed when conditions i) and iii) are established. The aforementioned conditions include: i) the change of the combustion mode is accompanied by an increase in engine power; ii) the power running mode is executed during the gear shift operation; and iii) the regeneration mode is executed during the gear shift operation.

7 Claims, 9 Drawing Sheets

(51) Int. Cl.
*B60W 10/115* (2012.01)
*B60K 6/24* (2007.10)
*B60K 6/26* (2007.10)
*B60K 6/365* (2007.10)
*B60K 6/547* (2007.10)

(52) U.S. Cl.
CPC .............. *B60K 6/547* (2013.01); *B60W 10/06* (2013.01); *B60W 10/08* (2013.01); *B60W 10/115* (2013.01); *B60W 2710/0622* (2013.01); *B60W 2710/0677* (2013.01); *B60W 2710/086* (2013.01); *B60W 2710/1005* (2013.01); *B60Y 2200/92* (2013.01); *B60Y 2300/182* (2013.01); *B60Y 2300/188* (2013.01); *Y10S 903/905* (2013.01); *Y10S 903/906* (2013.01); *Y10S 903/911* (2013.01); *Y10S 903/917* (2013.01); *Y10S 903/93* (2013.01)

(58) Field of Classification Search
USPC ......... 701/22, 54; 180/65.21, 65.23, 65.265; 903/947, 930
See application file for complete search history.

(56) References Cited

U.S. PATENT DOCUMENTS

| | | | | |
|---|---|---|---|---|
| 7,104,347 | B2* | 9/2006 | Severinsky | B60H 1/004 180/65.23 |
| 7,237,634 | B2* | 7/2007 | Severinsky | B60H 1/004 180/65.23 |
| 7,392,871 | B2* | 7/2008 | Severinsky | B60H 1/004 180/233 |
| 7,455,134 | B2* | 11/2008 | Severinsky | B60H 1/004 180/65.1 |
| 7,520,353 | B2* | 4/2009 | Severinsky | B60H 1/004 180/65.265 |
| 7,559,388 | B2* | 7/2009 | Severinsky | B60H 1/004 180/65.21 |
| 7,597,164 | B2* | 10/2009 | Severinsky | B60H 1/004 180/65.27 |
| 8,214,097 | B2* | 7/2012 | Severinsky | B60H 1/004 180/65.21 |
| 8,630,761 | B2* | 1/2014 | Severinsky | B60H 1/004 318/139 |
| 9,050,972 | B2* | 6/2015 | Severinsky | B60H 1/004 |

FOREIGN PATENT DOCUMENTS

| | | |
|---|---|---|
| JP | 2011-218945 A | 11/2011 |
| JP | 2012-240551 A | 12/2012 |

OTHER PUBLICATIONS

Rossi et al., Series Hybrid Powertrain Based on the Dual Two Level Inverter, 2008, p. 277-286.*

Picarelli et al., Simulating the complete 2014 hybrid electric Formula 1 cars, 2014, IEEE, p. 1-6.*

Hubbard et al., Modeling and Simulation of a Hybrid-Electric Vehicle Drivetrain, 1997, IEEE, p. 936-640.*

* cited by examiner

FIG. 2

|  | C1 | C2 | B1 | B2 | F1 |
|---|---|---|---|---|---|
| 1st | O |  |  | O | O |
| 2nd | O |  | O |  |  |
| 3rd | O | O |  |  |  |
| 4th |  | O | O |  |  |
| Rev | O |  |  | O |  |
| N |  |  |  |  |  |

O : ENGAGED STATE

CONTROL SYSTEM FOR HYBRID VEHICLE

INCORPORATION BY REFERENCE

The disclosure of Japanese Patent Application No. 2015-091107 filed on Apr. 28, 2015 including the specification, drawings and abstract is incorporated herein by reference in its entirety.

BACKGROUND OF THE INVENTION

1. Field of the Invention

Embodiments of the present invention relate to a control system that is applied to a hybrid vehicle in which an internal combustion engine and a motor generator are provided on an input side of a transmission mechanism.

2. Description of Related Art

As a control system for a hybrid vehicle, a system that suppresses a fluctuation in engine torque that is generated during a gear shift operation of an automatic transmission by properly using control of a motor generator and control of an electronic throttle valve in accordance with a state of charge of a battery is known (Japanese Patent Application Publication No. 2000-83303 (JP 2000-83303 A)). Other than JP 2000-83303 A, as related art literature associated with the invention, Japanese Patent Application Publication No. 2012-240551 (JP 2012-240551 A), Japanese Patent Application Publication No. 2011-218945 (JP 2011-218945 A), and Japanese Patent Application Publication No. 2004-203218 (JP 2004-203218 A) are available.

The device in JP 2000-83303 A reduces the engine torque by reducing an intake air amount through the control of the electronic throttle valve. However, because the control of the electronic throttle valve is accompanied by a reduction in the intake air amount, fuel economy is degraded. In addition, because whether to permit the control of the motor generator is influenced by the state of charge of the battery, there is a possibility that the fluctuation in the engine torque cannot be suppressed sufficiently only by the control of the motor generator. For this reason, this control system uses both the control of the motor generator and the control of the electronic throttle valve in the case where a fluctuation width of the engine torque is large and thus the fluctuation in the engine torque cannot be suppressed only by the control of the motor generator.

With respect to internal combustion engines, both an internal combustion engine in which one combustion mode is maintained, but also an internal combustion engine in which a change of the combustion mode that is accompanied by a change of an air-fuel ratio is executed, are available. When the change of the combustion mode is executed, it is accompanied by the change of the air-fuel ratio. Thus, engine power fluctuates. In the case where such an internal combustion engine is mounted in a hybrid vehicle that is provided with a transmission mechanism, a fluctuation in output that is caused by the change of the combustion mode and a fluctuation in output that is caused by a gear shift operation of the transmission mechanism are possibly generated.

In the case where these fluctuations in the output are generated in time periods that are sufficiently separated from each other, these fluctuations can be alleviated individually by the control of the motor generator. However, in the case where a combustion mode change request and a gear shift request of the transmission mechanism of the internal combustion engine overlap, it is desired that execution time periods of the change of the combustion mode and the control of the motor generator are re-examined and, in this way, fluctuations in the output are suppressed as much as possible from becoming large within a range of input/output limit in which overcharging and overdischarging of the battery can be avoided.

SUMMARY

In view of the above, embodiments of the invention provide a control system for a hybrid vehicle that can suppress a fluctuation in output as much as possible within a range of input/output limit of a battery.

A first embodiment of the invention provides a control system for a hybrid vehicle. The hybrid vehicle includes an internal combustion engine, a battery, a motor generator, and a transmission mechanism. The internal combustion engine is capable of changing a combustion mode accompanied by a change of an air-fuel ratio. The motor generator is electrically connected to the battery. The internal combustion engine and the motor generator are provided on an input side of the transmission mechanism. The control system includes an electronic control unit. The electronic control unit is configured to be able to selectively execute a power running mode in which power running of the motor generator is executed by using electric power of the battery and a regeneration mode in which regeneration control is executed in the motor generator so as to charge the battery. The electronic control unit is configured to execute a change of the combustion mode in an inertia-phase period during a gear shift operation, or after the gear shift operation is completed, in embodiments where a request for the change of the combustion mode and a request for a gear shift of the transmission mechanism overlap. The electronic control unit is configured to execute the change of the combustion mode in the inertia-phase period during the gear shift operation, in embodiments where the following conditions i) and ii) are established. The electronic control unit is configured to execute the change of the combustion mode after the gear shift operation is completed in embodiments where the following conditions i) and iii) are established. The aforementioned conditions include: i) the change of the combustion mode is accompanied by an increase in engine power; ii) the power running mode is executed during the gear shift operation; and iii) the regeneration mode is executed during the gear shift operation.

The power running mode is executed in embodiments where a fluctuation in output has to be suppressed by increasing a rotational speed on the input side during the gear shift operation of the transmission mechanism. The regeneration mode is executed in embodiments where the fluctuation in the output has to be suppressed by reducing the rotational speed on the input side during the gear shift operation of the transmission mechanism. In this way, the fluctuation in the output that is associated with the gear shift operation of the transmission mechanism is suppressed.

In embodiments where the power running mode is executed during the gear shift operation, the change of the combustion mode that is accompanied by the increase in the engine power is executed in the inertia-phase period. Accordingly, an increased amount of the engine power can be used for the gear shift operation in the inertia phase. In this way, consumed electric power of the motor generator by execution of the power running mode can be reduced. In addition, in the inertia phase (in comparison with a torque phase), a fluctuation in engine torque is less likely to be transmitted as the fluctuation in the output. Thus, by executing the change of the combustion mode that is accompanied by the increase in the engine power in the inertia-phase period, the increase in the engine power that is associated with the change of the combustion mode can be used during the gear shift operation while the fluctuation in the output is suppressed as much as possible.

Meanwhile, in embodiments where the regeneration mode is executed during the gear shift operation, the change of the combustion mode that is accompanied by the increase in the engine power is executed after the gear shift operation is completed. If it is assumed that the change is executed during the gear shift operation, the electric power that corresponds to the increased amount of the engine power is added to the electric power that is generated by the motor generator in the regeneration mode. Accordingly, the battery may be overcharged. In order to avoid overcharging of the battery, a power generation amount of the motor generator has to be limited. Thus, the fluctuation in the output cannot sufficiently be suppressed. In a first embodiment of the invention, the change of the combustion mode that is accompanied by the increase in the engine power is executed after the gear shift operation is completed. Thus, opportunities to charge the battery by execution of the regeneration mode are spread apart. In this way, while the overcharging of the battery is avoided, the fluctuation in the output can be suppressed. That is, because the change of the combustion mode that is accompanied by the increase or reduction in the engine power is executed at appropriate timing in accordance with an operation mode of the motor generator during the gear shift operation, the fluctuation in the output can be suppressed as much as possible within a range of input/output limit of the battery.

In an embodiment of the invention, the electronic control unit may be configured to execute the change of the combustion mode without controlling the engine torque in a direction to compensate for the increase in the engine power by the change of the combustion mode. When an operation, such as a reduction in an intake air amount or delaying of ignition timing, is performed for the engine, the engine torque is reduced. Accordingly, the engine torque can be controlled in a direction to compensate for the increase in the engine power. However, by such control, combustion efficiency is degraded, resulting in degradation of fuel economy. According to this embodiment, because such control is not executed, the degradation of the fuel economy can be avoided.

A stoichiometric combustion operation is an operation of an internal combustion engine in which a theoretical air-fuel ratio and an air-fuel ratio near the theoretical air-fuel ratio are set as targets. A lean combustion operation is an operation of an internal combustion engine in which an air-fuel ratio that is on a leaner side than the targets of the stoichiometric combustion operation is set as a target. A lean burn engine is an internal combustion engine configured such that rich spike for temporarily changing the air-fuel ratio to a rich side during the lean combustion operation is executed. In embodiments of the invention, the internal combustion engine may be configured to be able to switch between the stoichiometric combustion operation and the lean combustion operation. The internal combustion engine may be the lean burn engine. The change of the combustion mode accompanied by the increase in the engine power may correspond to switching from the lean combustion operation to the stoichiometric combustion operation or executing the rich spike. According to this configuration, the switching from the lean combustion operation to the stoichiometric combustion operation and the execution of the rich spike of the internal combustion engine that is accompanied by the increase in the engine power are executed at appropriate timing. Thus, the fluctuation in the output can be suppressed as much as possible within the range of the input/output limit of the battery.

The electronic control unit may be configured to execute the change of the combustion mode after the gear shift operation is completed in an embodiment where the following conditions iv) and v) are established. The electronic control unit may be configured to execute the change of the combustion mode in the inertia-phase period during the gear shift operation in an embodiment where the following conditions iv) and vi) are established. The aforementioned conditions include: iv) the change of the combustion mode is accompanied by a reduction in the engine power; v) the power running mode is executed during the gear shift operation; and vi) the regeneration mode is executed during the gear shift operation.

In an embodiment where the power running mode is executed during the gear shift operation, the change of the combustion mode that is accompanied by the reduction in the engine power is executed after the gear shift operation is completed. If it is assumed that the change is executed during the gear shift operation, the electric power that corresponds to a reduced amount of the engine power is added to the electric power that is consumed by the motor generator in the power running mode. Accordingly, the battery may be overdischarged. According to this embodiment, the change of the combustion mode that is accompanied by the reduction in the engine power is executed after the gear shift operation is completed. Thus, discharging opportunities of the battery by the execution of the power running mode are spread apart. In this way, while the overdischarging of the battery is avoided, the fluctuation in the output can be suppressed. Meanwhile, in an embodiment where the regeneration mode is executed during the gear shift operation, the change of the combustion mode that is accompanied by the reduction in the engine power is executed in the inertia-phase period. Accordingly, because the power generation amount that is generated by the motor generator in the regeneration mode is reduced by the reduction amount of the engine power, the battery is less likely to be overcharged. In addition, in the inertia phase (in comparison with the torque phase), the fluctuation in the engine torque is less likely to be transmitted as the fluctuation in the output. Thus, while the overcharging of the battery is avoided, the fluctuation in the output can be suppressed as much as possible.

In embodiments of the invention, the internal combustion engine may be configured to be able to switch between the stoichiometric combustion operation and the lean combustion operation, the internal combustion engine being the lean burn engine. The change of the combustion mode that is accompanied by the increase in the engine power may correspond to switching from the lean combustion operation to the stoichiometric combustion operation or execution of the rich spike. The change of the combustion mode that is accompanied by the reduction in the engine power may correspond to switching from the stoichiometric combustion operation to the lean combustion operation. According to this configuration, each of the switching from the lean combustion operation to the stoichiometric combustion operation, the switching from the stoichiometric combustion operation to the lean combustion operation, and the execution of the rich spike of the internal combustion engine is executed at appropriate timing. Thus, the fluctuation in the output can be suppressed as much as possible within the range of the input/output limit of the battery.

A second embodiment of the invention provides a control system for a hybrid vehicle. The hybrid vehicle of this embodiment includes an internal combustion engine, a battery, a motor generator, and a transmission mechanism. The internal combustion engine is capable of changing a combustion mode accompanied by a change of an air-fuel ratio. The motor generator is electrically connected to the battery. The internal combustion engine and the motor generator are provided on an input side of the transmission mechanism. The control system includes an electronic control unit. The electronic control unit is configured to be able to selectively execute a power running mode in which power running of the motor generator is executed by using electric power of the battery and a regeneration mode in which regeneration control is executed in the motor generator so as to charge the battery. The electronic control unit is configured to execute a change of the combustion mode in an inertia-phase period during a gear shift operation, or after the gear shift operation is completed, in embodiments where a request for the change of the combustion mode and a request for a gear shift of the transmission mechanism overlap. The electronic control unit is configured to execute the change of the combustion mode after the gear shift operation is completed in embodiments where the following conditions i) and ii) are established. The electronic control unit is configured to execute the change of the combustion mode in the inertia-phase period during the gear shift operation in an embodiment where the following conditions i) and iii) are established. The aforementioned conditions include: i) the change of the combustion mode is accompanied by a reduction in engine power; ii) the power running mode is executed during the gear shift operation; and iii) the regeneration mode is executed during the gear shift operation.

The power running mode is executed in embodiments where the fluctuation in the output has to be suppressed by increasing the rotational speed on the input side during the gear shift operation of the transmission mechanism. The regeneration mode is executed in embodiments where the fluctuation in the output has to be suppressed by reducing the rotational speed on the input side during the gear shift operation of the transmission mechanism. In this way, the fluctuation in the output that is associated with the gear shift operation of the transmission mechanism is suppressed. In an embodiment where the power running mode is executed during the gear shift operation, the change of the combustion mode that is accompanied by the reduction in the engine power is executed after the gear shift operation is completed. If it is assumed that the change is executed during the gear shift operation, the electric power that corresponds to the reduction amount of the engine power is added to the electric power that is consumed by the motor generator in the power running mode. Accordingly, the battery may be overdischarged. According to a second embodiment of the invention, the change of the combustion mode that is accompanied by the reduction in the engine power is executed after the gear shift operation is completed. Thus, the discharging opportunities of the battery by the execution of the power running mode are spread apart. In this way, while the overdischarging of the battery is avoided, the fluctuation in the output can be suppressed. Meanwhile, in an embodiment where the regeneration mode is executed during the gear shift operation, the change of the combustion mode that is accompanied by the reduction in the engine power is executed in the inertia-phase period. Accordingly, because the power generation amount that is generated by the motor generator in the regeneration mode is reduced by the reduction amount of the engine power, the battery is less likely to be overcharged. In addition, in the inertia phase (in comparison with the torque phase), the fluctuation in the engine torque is less likely to be transmitted as the fluctuation in the output. Thus, while the overcharging of the battery is avoided, the fluctuation in the output can be suppressed as much as possible. That is, the change of the combustion mode that is accompanied by the increase or reduction in the engine power is executed at appropriate timing in accordance with the operation mode of the motor generator during the gear shift operation. Thus, the fluctuation in the output can be suppressed as much as possible within the range of the input/output limit of the battery.

A stoichiometric combustion operation is an operation of the internal combustion engine in which a theoretical air-fuel ratio and an air-fuel ratio near the theoretical air-fuel ratio are set as targets. A lean combustion operation is an operation of the internal combustion engine in which an air-fuel ratio that is on a leaner side than the targets of the stoichiometric combustion operation is set as a target. A lean burn engine is an internal combustion engine configured such that rich spike for temporarily changing the air-fuel ratio to a rich side during the lean combustion operation is executed. In embodiments of the invention, the internal combustion engine may be configured to be able to switch between the stoichiometric combustion operation and the lean combustion operation. The internal combustion engine may be the lean burn engine. The change of the combustion mode that is accompanied by the reduction in the engine power may correspond to switching from the stoichiometric combustion operation to the lean combustion operation. According to this configuration, the switching from the stoichiometric combustion operation that is accompanied by the reduction in the engine power to the lean combustion operation of the internal combustion engine is executed at appropriate timing. Thus, the fluctuation in the output can be suppressed as much as possible within the range of the input/output limit of the battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is an actuation engagement table of an automatic transmission;

DETAILED DESCRIPTION OF EMBODIMENTS

Figure 1:
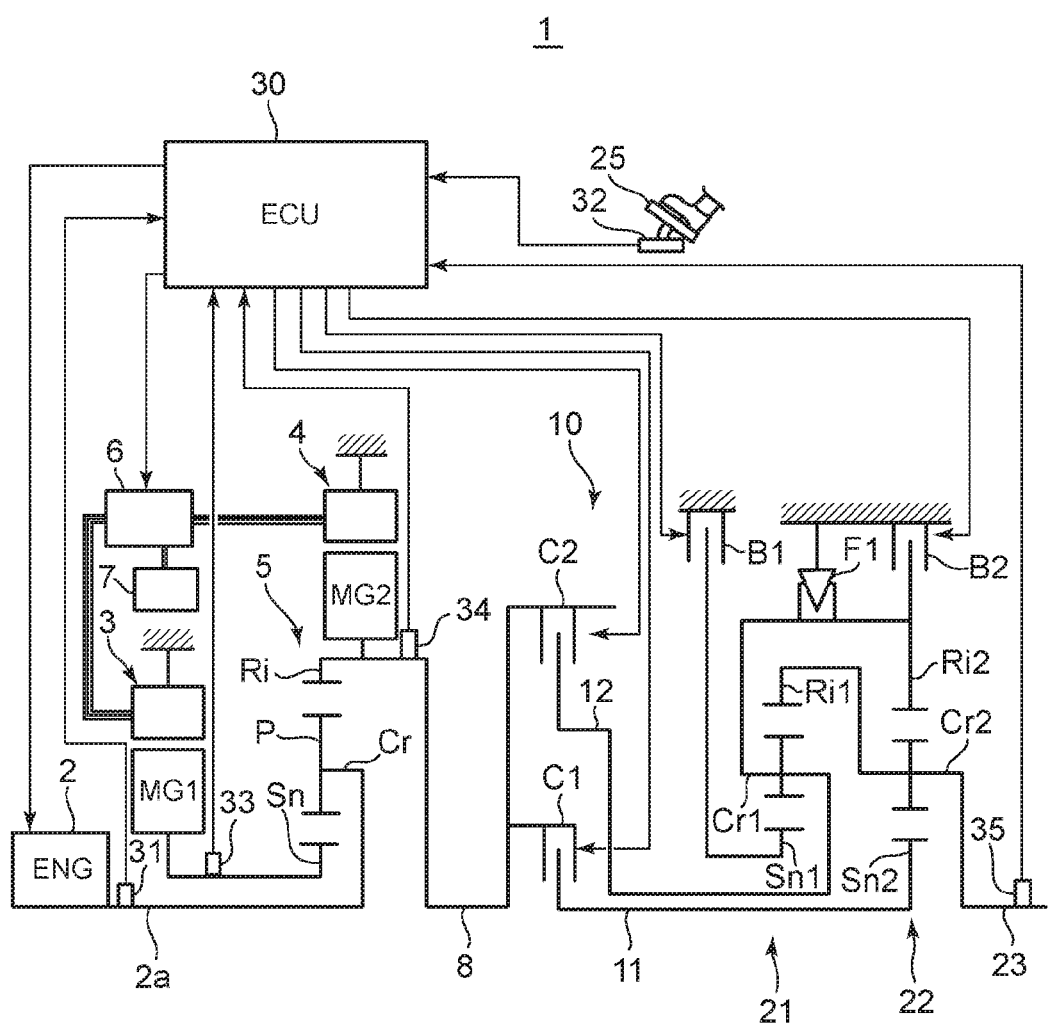
FIG. 1 is a view of an overall configuration of a hybrid vehicle, to which a control apparatus according to an embodiment of the invention is applied.

As shown in FIG. 1, a vehicle 1 is constructed as a so-called hybrid vehicle in which an internal combustion engine 2 and two motor generators 3, 4 are provided as travel power sources. The internal combustion engine 2, the first motor generator 3, and the second motor generator 4 are coupled to a power split mechanism 5.

The internal combustion engine 2 is constructed as a lean burn engine of a spark ignition type that includes plural cylinders (not shown). As is well-known, the lean burn engine can switch between a stoichiometric combustion operation in which a theoretical air-fuel ratio and an air-fuel ratio near the theoretical air-fuel ratio are set as targets and a lean combustion operation in which an air-fuel ratio that is on a leaner side than the targets of the stoichiometric combustion operation is set as a target. In addition, where an exhaust purification function of an exhaust purification catalyst mounted in the internal combustion engine 2 is deteriorated due to continuation of the lean combustion operation, in order to recover the deteriorated exhaust purification function, rich spike in which the air-fuel ratio is temporarily changed to a rich side during the lean combustion operation is executed.

Switching from the lean combustion operation to the stoichiometric combustion operation is executed for a short time by a temporal increase in a fuel injection amount in consideration of a response delay of an intake air amount. In a period in which the response delay of the intake air amount occurs, it is necessary to switch from a target air-fuel ratio of the lean combustion operation (for example: 22.1) to a target air-fuel ratio of the stoichiometric combustion operation (for example: 14.7) by increasing fuel. Accordingly, the fuel injection amount, after the change in air-fuel ratio compared to before the change, becomes $22.1/14.7 \approx 1.5$ times larger. In this way, where an engine speed is the same, engine power of the internal combustion engine 2 is increased by approximately 50% before and after the change of the air-fuel ratio. Where the engine speed is increased before and after the change, the engine power is increased even more. Meanwhile, switching from the stoichiometric combustion operation to the lean combustion operation is executed by temporarily reducing a fuel amount. Thus, the engine power of the internal combustion engine 2 is reduced. In addition, because execution of the rich spike is accompanied by a temporal increase in the fuel amount, the engine power of the internal combustion engine 2 is increased. Any of the changes of these combustion modes is accompanied by a change of the air-fuel ratio. The switching from the lean combustion operation to the stoichiometric combustion operation and the execution of the rich spike correspond to a change of the combustion mode that is accompanied by an increase in the engine power, and the switching from the stoichiometric combustion operation to the lean combustion operation corresponds to the change of the combustion mode that is accompanied by a reduction in the engine power.

Each of the motor generators 3, 4 is connected to a battery 7 via a motor controller 6. The motor controller 6 is constructed as a control circuit that includes an unillustrated inverter, converts electric power generated by each of the motor generators 3, 4 into DC power so as to store the DC power in the battery 7, and converts the electric power of the battery 7 into AC power and supplies the AC power to each of the motor generators 3, 4. An operation of each of the motor generators 3, 4 is controlled by operating the motor controller 6.

The power split mechanism 5 is constructed as a planetary gear unit of a single pinion type, and includes a sun gear Sn as an external gear, a ring gear Ri as an internal gear, and a carrier Cr for supporting a pinion P that meshes with these gears Sn, Ri in a freely rotating and revolving manner. These rotation elements Sn, Ri, Cr can make differential rotation among them. The first motor generator 3 is coupled to the sun gear Sn, the second motor generator 4 is coupled to the ring gear Ri via a transmission shaft 8, and an output shaft 2a of the internal combustion engine 2 is coupled to the carrier Cr. The second motor generator 4 corresponds to a motor generator according to embodiments of the invention.

An automatic transmission 10 as a transmission mechanism is provided in a power transmission path on a drive wheel side from the second motor generator 4. In other words, the internal combustion engine 2 and the second motor generator 4 are provided on an input side of the automatic transmission 10. The automatic transmission 10 has two input shafts 11, 12. Two clutches C1, C2 are provided between these input shafts 11, 12 and the transmission shaft 8 that is coupled to integrally rotate with the ring gear Ri. By operating these clutches C1, C2, one input shaft of the two input shafts 11, 12 can selectively be coupled to the transmission shaft 8. The automatic transmission 10 is configured by combining two units of planetary gear units 21, 22 and by providing two brakes B1, B2 and a one-way clutch F1. The two units of the planetary gear units 21, 22 are combined with each other by coupling a carrier Cr1 of one unit to a ring gear Ri2 of the other unit, and coupling a ring gear Ri1 of the one unit to a carrier Cr2 of the other unit. The first input shaft 11 is coupled to a sun gear Sn2, and the second input shaft 12 is coupled to the carrier Cr1. The carrier Cr2 is coupled to a drive shaft 23 for driving unillustrated drive wheels. The carrier Cr1 and the ring gear Rr2 that are coupled to each other are provided with the one-way clutch F1 that permits rotation in only one direction.

Figure 3:
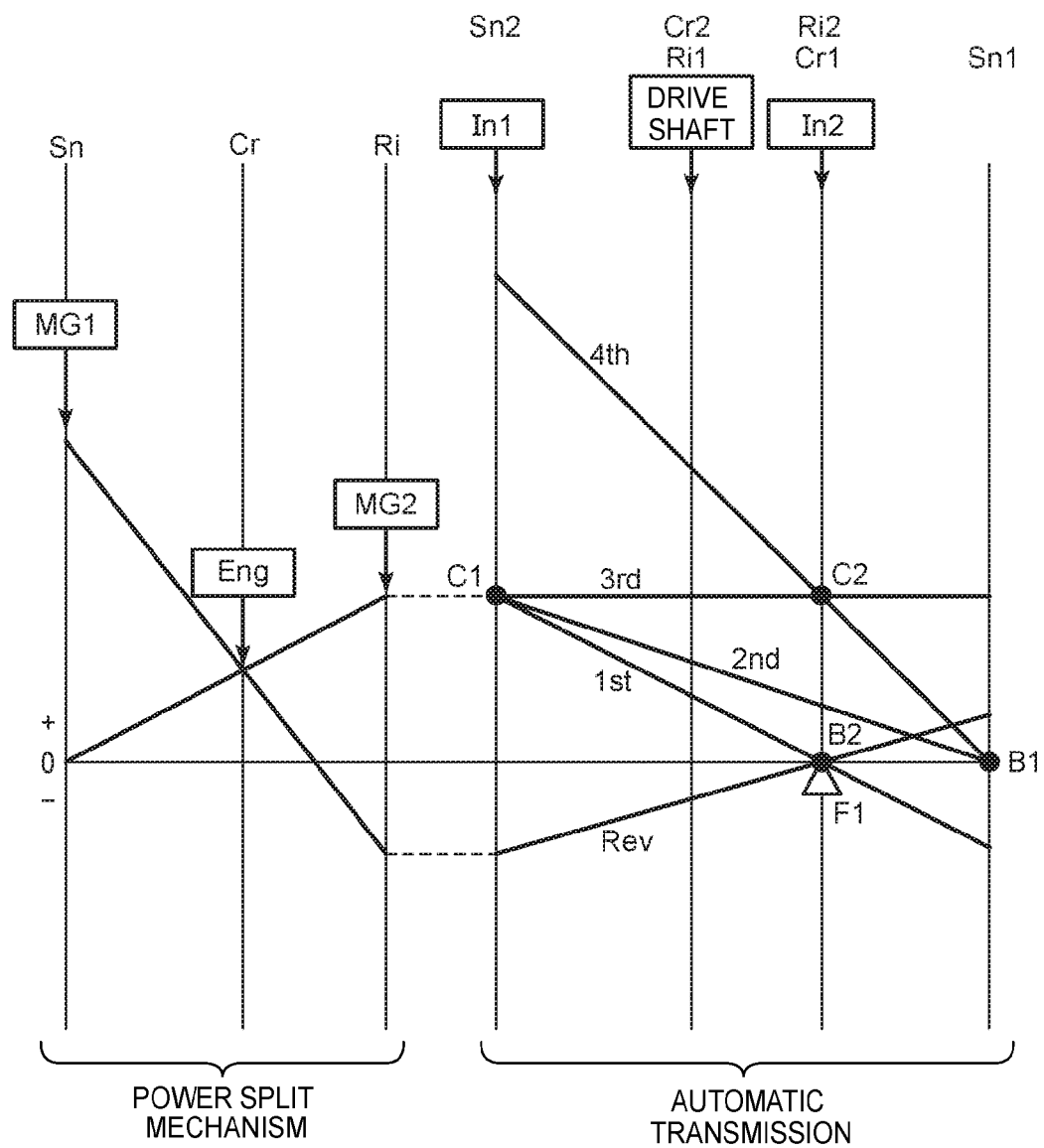
FIG. 3 is a collinear diagram (a speed diagram) of each element of the vehicle in FIG. 1.

By changing operation states of the clutches C1, C2 and the brakes B1, B2 by using unillustrated hydraulic device and control valve, as shown in an actuation engagement table in FIG. 2, the vehicle 1 can select one gear stage from plural gear stages that include 4 forward gear stages and 1 rearward gear stage. It should be noted that "N" in FIG. 2 means neutral and "circle" means an engaged state of the clutch or the brake. Blank spaces in FIG. 2 each mean a disengaged state of the clutch or the brake. For a first gear stage (1st), a second gear stage (2nd), a third gear stage (3rd), a fourth gear stage (4th), and reverse (Rev), gear shift ratios (gear ratios) that differ among them are set. A collinear diagram (a speed diagram) of each element of the vehicle 1 where each of the gear stages of the first gear stage to the fourth gear stage in FIG. 2 is selected is as shown in FIG. 3. It should be noted that, in FIG. 3, "Eng" means the internal combustion engine 2, "MG1" means the first motor generator 3, "MG2" means the second motor generator 4, "In1" means the first input shaft 11, and "In2" means the second input shaft 12.

As shown in FIG. 1, each section of the vehicle 1 is controlled by an electronic control unit (ECU) 30 that serves as a control apparatus in embodiments of the invention. The ECU 30 receives signals from various sensors. For example, the ECU 30 receives output signals from a crank angle sensor 31 that outputs a signal corresponding to an engine speed of the internal combustion engine 2, an accelerator operation amount sensor 32 that outputs a signal corresponding to a depression amount of an accelerator pedal 25, a first resolver 33 that outputs a signal corresponding to a rotational speed of the first motor generator 3, a second resolver 34 that outputs a signal corresponding to a rotational speed of the second motor generator 4, a vehicle speed sensor 35 that outputs a signal corresponding to a vehicle speed of the vehicle 1 on the basis of a rotational speed of the drive shaft 23.

The ECU 30 controls an operation of each of the first motor generator 3 and the second motor generator 4 on the basis of information from the aforementioned various sensors and a specified program, determines an operation condition of the internal combustion engine 2, and performs operation control of the internal combustion engine 2 in accordance with the operation condition. Furthermore, the ECU 30 performs gear shift control of the automatic transmission 10.

The ECU 30 calculates request power that a driver requests to the vehicle 1 by referring to the output signal of the accelerator operation amount sensor 32 and the output signal of the vehicle speed sensor 35, and controls the vehicle 1 while switching among various modes such that system efficiency with respect to the request power becomes optimum. For example, in a low load region where thermal efficiency of the internal combustion engine 2 is degraded, an EV travel mode in which combustion of the internal combustion engine 2 is stopped and the second motor generator 4 is driven is selected. In addition, where enough torque is not generated only by the internal combustion engine 2, a hybrid travel mode in which the internal combustion engine 2 and the second motor generator 4 are used as travel drive sources is selected.

The internal combustion engine 2 is controlled by the ECU 30 such that the thermal efficiency thereof becomes optimum in principle. The ECU 30 controls motor torque of the first motor generator 3, for example, such that an operation point of the internal combustion engine 2 that is defined by the engine speed and engine torque moves along an optimum fuel economy line that is set in advance. The optimum fuel economy line is prepared for every operation mode of the internal combustion engine 2, and the ECU 30 performs control of the internal combustion engine 2 that is suitable for a current operation mode. The ECU 30 measures the air-fuel ratio of the internal combustion engine 2, and performs feedback control such that a deviation between the measured air-fuel ratio and a target air-fuel ratio in the current operation mode is reduced.

(Switching of Operation Mode)

According to embodiments of the invention, the switching of the operation mode between the stoichiometric combustion operation and the lean combustion operation is executed when the ECU 30 determines whether a current operation condition belongs to either a stoichiometric combustion region or a lean combustion region defined by the engine speed and the engine torque. Where the operation condition of the internal combustion engine 2 is changed from a state of belonging to either one region of the stoichiometric combustion region or the lean combustion region to a state of belonging to the other region, the ECU 30 generates an operation mode switching request, later changes the air-fuel ratio, and switches the operation mode. The operation mode switching request corresponds to a combustion mode change request.

As described above, the switching from the lean combustion operation to the stoichiometric combustion operation is accompanied by an increase in the engine power. Accordingly, when the increased engine power is output as is from the drive shaft 23, a fluctuation in output is generated, and an occupant of the vehicle 1 experiences a shock. Thus, the ECU 30 controls the second motor generator 4 in a direction to compensate for the increase in the engine power that is associated with the switching from the lean combustion operation to the stoichiometric combustion operation, and suppresses the fluctuation in the output. Meanwhile, as described above, the switching from the stoichiometric combustion operation to the lean combustion operation is accompanied by a reduction in the engine power. Thus, the ECU 30 controls the second motor generator 4 such that the reduction in the engine power that is associated with the switching is compensated.

(Execution of Rich Spike)

When the lean combustion operation is continued, an amount of NOx that is occluded in the unillustrated exhaust purification catalyst is increased, and a purifying function of the exhaust purification catalyst is deteriorated. In embodiments of the invention, the ECU 30 determines necessity of the above-described rich spike by referring to various parameters that are correlated with a NOx occluded amount. Then, when the execution of the rich spike becomes necessary, the ECU 30 generates a rich spike execution request. The rich spike execution request corresponds to the combustion mode change request that is described above. The ECU 30 executes the rich spike when the rich spike execution request is established. As described above, the execution of the rich spike is accompanied by the temporal increase in the fuel amount. Accordingly, the engine power of the internal combustion engine 2 is increased. When the increased engine power is output as is from the drive shaft 23, the fluctuation in the output is generated, and the occupant of the vehicle 1 experiences a shock. Thus, the ECU 30 controls the second motor generator 4 in a direction to compensate for the increase in the engine power that is associated with the rich spike, so as to suppress the fluctuation in the output.

(Gear Shift Control of an Automatic Transmission)

The ECU 30 generates a gear shift request on the basis of a specified shift schedule, a shift change request by the driver, or the like. Afterwards, the ECU 30 controls the clutches C1, C2 and the brakes B1, B2 of the automatic transmission 10 such that the gear stage corresponding to the gear shift request is realized. A period from a start of a gear shift operation to completion of the gear shift operation of the automatic transmission 10 is divided into a torque-phase period in which a rotational speed on the input side of the automatic transmission 10 is substantially constant and an inertia-phase period in which the rotational speed thereof is changed (see FIG. 4).

Where the automatic transmission 10 is downshifted, the rotational speed on the input side of the automatic transmission 10 is increased before and after downshifting. Where the automatic transmission 10 is upshifted, the rotational speed on the input side of the automatic transmission 10 is reduced before and after upshifting. Accordingly, in order to suppress the fluctuation in the output that is associated with the gear shift operation of the automatic transmission 10, an operation in which the rotational speed on the input side of the automatic transmission 10 (the rotational speeds of the input shafts 11, 12) is increased or reduced after a start of the operation and the rotational speed is synchronized with that on an output side is necessary. In this embodiment, in order to suppress the fluctuation in the output that is associated with the gear shift operation, an increase or a reduction in the rotational speed on the input side of the automatic transmission 10 is realized by selectively executing a power running mode in which power running of the second motor generator 4 is executed and a regeneration mode in which regeneration control is executed in the second motor generator 4. The ECU 30 functions as the motor control means according to this embodiment of the invention.

The power running mode is an operation mode in which the power running of the second motor generator 4 is executed by using the electric power of the battery 7. In the power running mode, the second motor generator 4 functions as a motor. Meanwhile, the regeneration mode is an operation mode in which the regeneration control is executed in the second motor generator so as to charge the battery 7. In the regeneration mode, the second motor generator 4 functions as a generator, and mechanical energy that is input to the second motor generator 4 is converted into electrical energy.

(Overlapping of a Combustion Mode Change Request and a Gear Shift Request)

Embodiments of the invention are characterized by control executed by the ECU 30 where a combustion mode change request, such as a rich spike execution request, an operation mode switching request between a lean combustion operation and a stoichiometric combustion operation, and a gear shift request to the automatic transmission 10 overlap. As described above, with respect to the change of the combustion mode that is associated with the increase in the engine power, the execution of the rich spike and the switching from the lean combustion operation to the stoichiometric combustion operation are present. In addition, with respect to the change of the combustion mode that is associated with the reduction in the engine power, the switching from the stoichiometric combustion operation to the lean combustion operation is present. In addition, the gear shift operation includes an embodiment where the power running mode, in which the rotational speed on the input side of the automatic transmission 10 is increased, is executed, and an embodiment where the regeneration mode for reducing the rotational speed thereon is executed. It should be noted that "overlapping" of a combustion mode change request and a gear shift request includes cases where the combustion mode change request is generated in a period from generation of the gear shift request to an actual start of the gear shift operation, that is, before the above torque-phase period is started; cases where the combustion mode change request is generated in a period from the actual start of the gear shift operation in response to the generation of the gear shift request to termination of the torque-phase period, that is, during the torque-phase period; cases where the combustion mode change request is generated at the same time as the gear shift request; and, cases where the gear shift request is generated in a period from the generation of the combustion mode change request to actual execution of the combustion mode change.

(Embodiments where Increase in Engine Power is Associated: Execution of Rich Spike)

Figure 4:
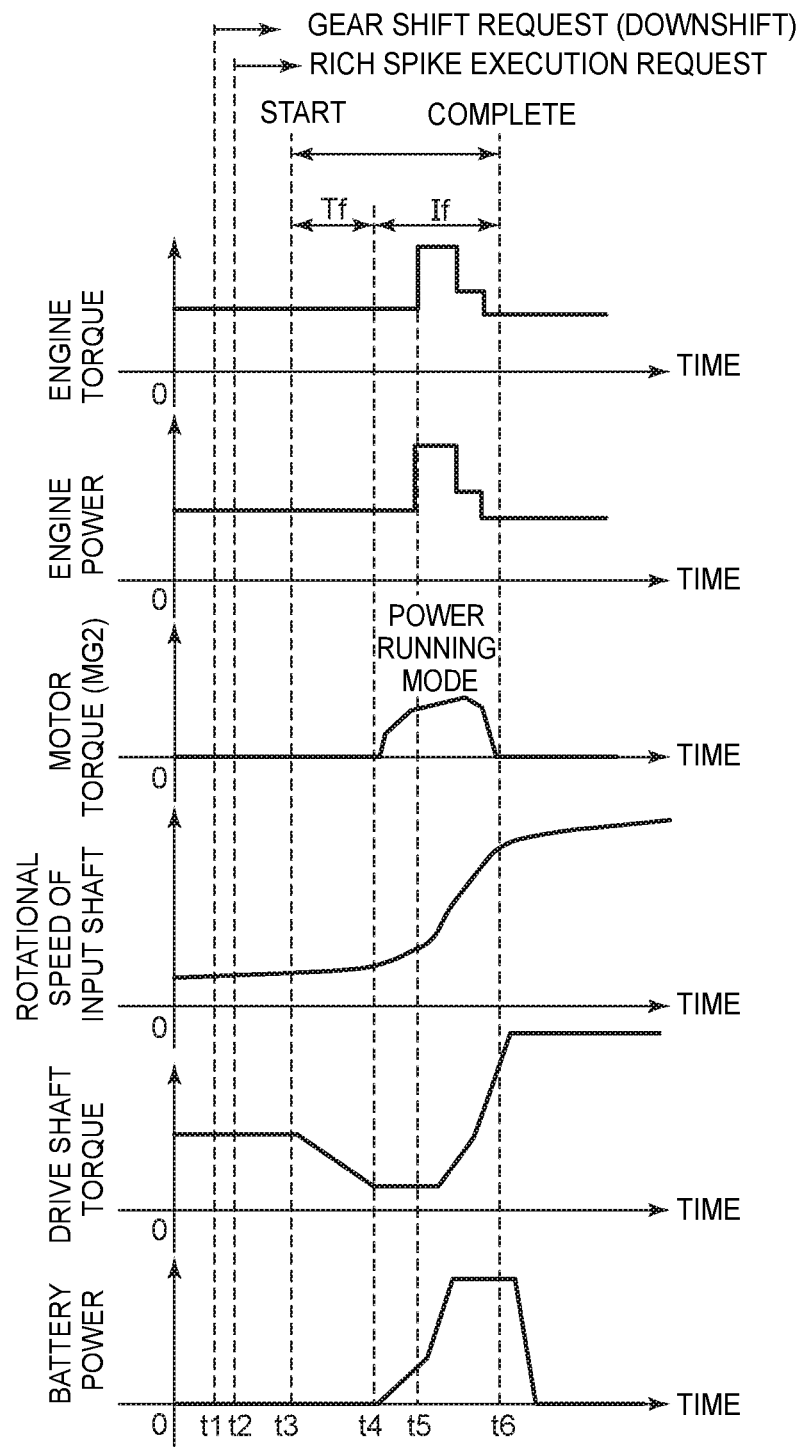
FIG. 4 is a timing chart of contents of control in embodiments where a gear shift request of downshifting and rich spike execution request overlap.

FIG. 4 shows a temporal change of each parameter where a gear shift request of the downshifting and a rich spike execution request overlap. In embodiments of the invention according to FIG. 4, the gear shift request of the downshifting is generated at a time t1, and the rich spike execution request is generated at a time t2. Because processes of the downshifting and the rich spike have not been started at a time point of the later generation of the rich spike execution request, these requests overlap each other. It should be noted that, even where the gear shift request of the downshifting and the rich spike execution request are generated at the same time or, contrary to embodiments according to FIG. 4, the rich spike execution request is generated before the gear shift request of the downshifting, these requests overlap each other.

In embodiments according to FIG. 4, the gear shift operation is started at a time t3. In the gear shift operation, a disengagement operation of the clutches C1, C2 or the brakes B1, B2 becomes a start point in accordance with a gear shift pattern. Once the gear shift operation is started, torque of the drive shaft 23 is reduced in a state where the rotational speed on the input side is substantially constant. A period from the time t3 at which the gear shift operation is started to a time t4 at which the reduction in the torque of the drive shaft 23 is stopped corresponds to a period of a torque phase Tf.

A period from the time t4 at which the period of the torque phase Tf ends to a time t6 at which the gear shift operation is completed corresponds to a period of an inertia phase If Because an embodiment according to FIG. 4 is a case of the downshifting, a power running mode in which the second motor generator 4 is used to increase the rotational speed on the input side of the automatic transmission 10 is executed. The execution of the power running mode is started at the time t4 at which the inertia phase If is started, and the rotational speed on the input side is thereby increased. During this time, because power running of the second motor generator 4 is performed by using the electric power of the battery 7, battery power has a positive value meaning electric power discharge, and the motor torque of the second motor generator 4 also has a positive value meaning the power running.

The rich spike is executed at a time t5 that is after the execution of the power running mode is started and that is in the period of the inertia phase If Because the increase in the fuel amount, by which the air-fuel ratio is temporarily changed to the rich side, occurs by the execution of the rich spike, the engine torque and the engine power of the internal combustion engine 2 are both increased stepwise. Thereafter, at the time t6, the gear shift operation is completed, and the process is terminated.

In an embodiment according to FIG. 4, because the rich spike is executed in the period of the inertia phase If, an increased amount of the engine power can be used for the gear shift operation in the inertia phase If Accordingly, consumed electric power of the second motor generator 4 by the execution of the power running mode can be reduced. In addition, in the inertia phase If, a fluctuation in the engine torque is less likely to be transmitted as a fluctuation in the output in comparison with the torque phase Tf. Thus, by executing the rich spike in the period of the inertia phase If, the increase in the engine power that is associated with the execution of the rich spike can be used during the gear shift operation while the fluctuation in the output is suppressed as much as possible.

Figure 5:
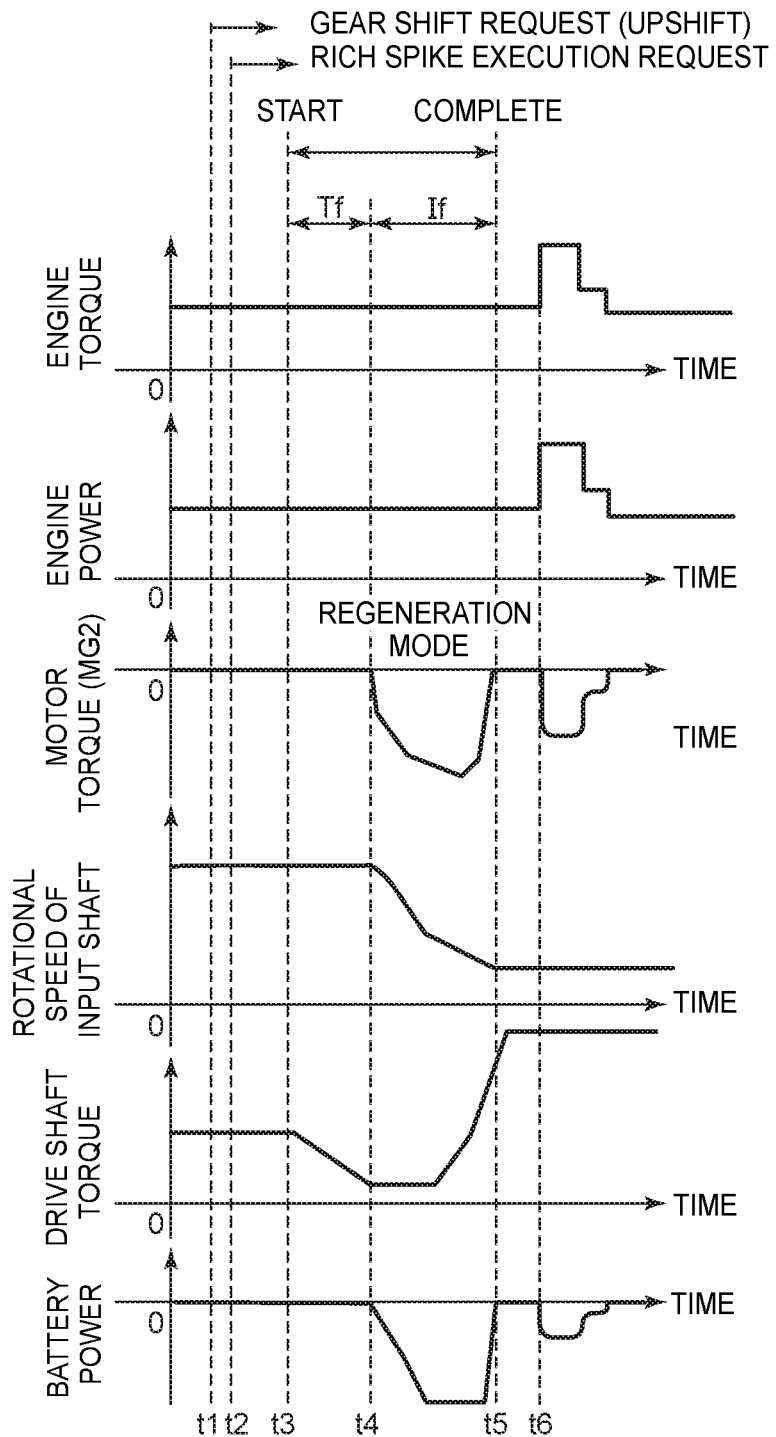
FIG. 5 is a timing chart of contents of control in embodiments where a gear shift request of upshifting and the rich spike execution request overlap.

FIG. 5 shows a temporal change of each parameter where a gear shift request of the upshifting and a rich spike execution request overlap. In embodiments according to FIG. 5, the gear shift request of the upshifting is generated at a time t1, and the rich spike execution request is generated at a time t2. An interpretation on overlapping of the two requests is the same as described above.

The gear shift operation is started at a time t3. In the gear shift operation, the disengagement operation of the clutches C1, C2 or the brakes B1, B2 becomes a start point in accordance with the gear shift pattern. Once the gear shift operation is started, the torque of the drive shaft 23 is reduced in a state where the rotational speed on the input side is substantially constant. The period from the time t3 at which the gear shift operation is started to a time t4 at which the reduction in the torque of the drive shaft 23 is stopped corresponds to a period of a torque phase Tf.

A period from the time t4 at which the period of the torque phase Tf ends to a time t5 at which the gear shift operation is completed corresponds to the period of the inertia phase If Because an embodiment according to FIG. 5 is a case of the upshifting, a regeneration mode in which the second motor generator 4 is used to reduce the rotational speed on the input side of the automatic transmission 10 is executed. The execution of the regeneration mode is started at the time t4 at which the inertia phase If is started, and the rotational speed on the input side is thereby reduced. During this time, the regeneration control, for which the second motor generator 4 is used, is executed, and the battery 7 is charged with the electric power that is generated by the second motor generator 4. Thus, the battery power has a negative value meaning charging, and the motor torque of the second motor generator 4 also has a negative value meaning regeneration.

The rich spike is executed at a time t6 after the completion of the gear shift operation. Because the increase in the fuel amount, by which the air-fuel ratio is temporarily changed to the rich side, occurs by the execution of the rich spike, the engine torque and the engine power of the internal combustion engine 2 are both increased stepwise. In synchronization with the execution of the rich spike, the regeneration control is executed by the second motor generator 4 so as to compensate for the increase in engine torque and the engine power. Due to execution of the regeneration control, the motor torque of the second motor generator 4 shows the negative value, and the battery power also shows the negative value.

In an embodiment according to FIG. 5, the rich spike is executed after the gear shift operation of the upshifting is completed. If it is assumed that the rich spike is executed during the gear shift operation, the electric power that corresponds to the increased amount of the engine power is added to the electric power that is generated by the second motor generator 4 in the regeneration mode. Accordingly, the battery 7 is possibly overcharged. In order to avoid overcharging of the battery 7, a power generation amount of the second motor generator 4 has to be limited. Thus, a fluctuation in the output cannot sufficiently be suppressed. In this embodiment, the rich spike is executed after the gear shift operation of the upshifting is completed. Thus, charging opportunities of the battery 7 by the execution of the regeneration mode are spread apart. That is, in embodiments according to FIG. 5, the charging opportunities are spread to the period from the time t4 to the time t5 and a period from the time t6 onward. In this way, while the overcharging of the battery 7 is avoided, the fluctuation in the output can be suppressed.

As it is apparent by referring to the changes of the engine torque in embodiments according to FIG. 4 and FIG. 5, the ECU 30 does not control the engine torque in a direction to compensate for the increase in the engine power that is associated with the execution of the rich spike. Control of the engine torque, such as a reduction in the intake air amount and delaying of ignition timing, is known. When such control is executed for the internal combustion engine 2, combustion efficiency is degraded, resulting in degradation of fuel economy. In embodiments of the invention, because that type of control is not executed, the degradation of the fuel economy can be avoided.

Figure 6:
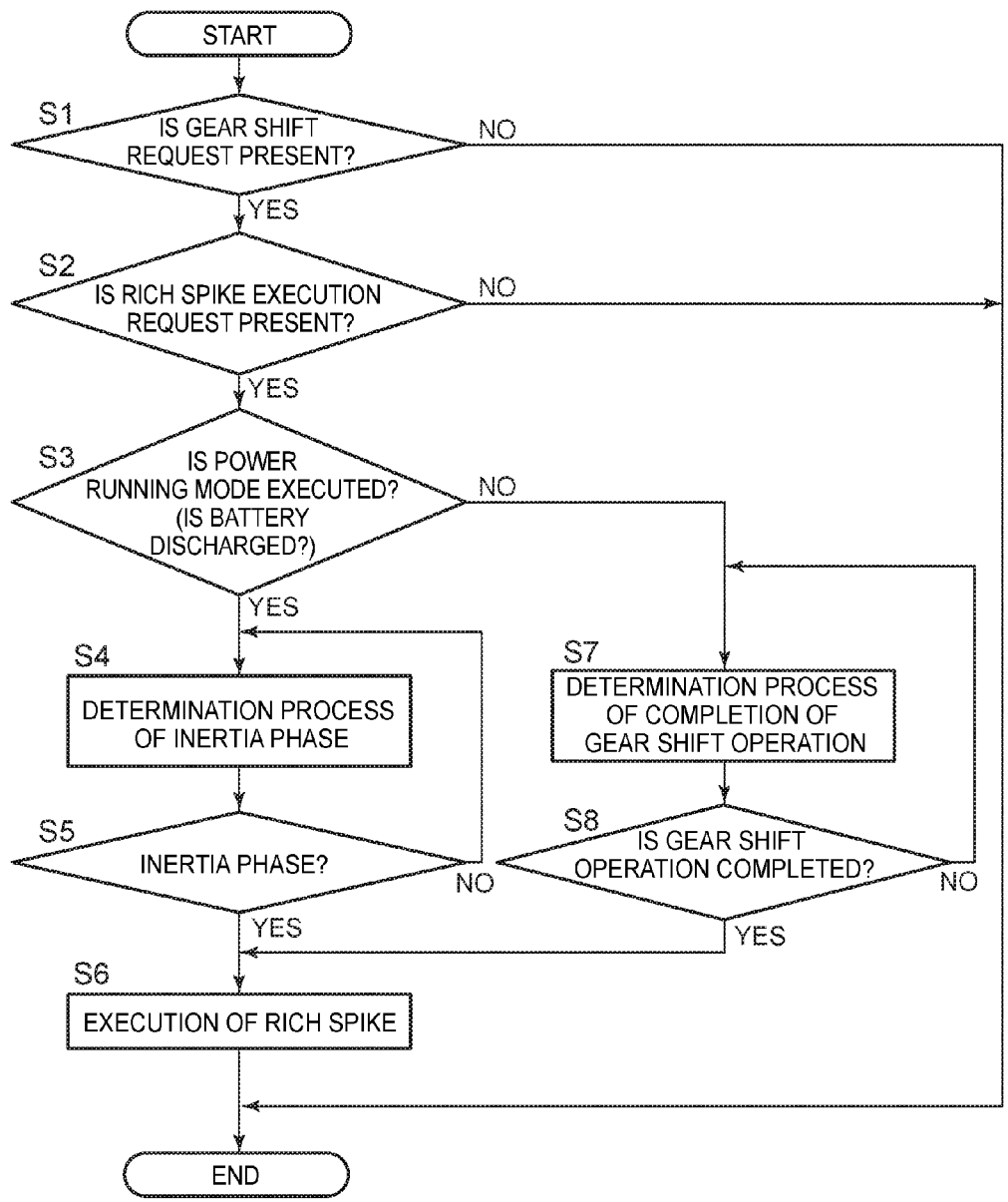
FIG. 6 is a flowchart of one example of a control routine where the gear shift request and the rich spike execution request overlap.

Each of the above-described control with respect to the power running mode and the regeneration mode in embodiments according to FIG. 4 and FIG. 5 can be realized, for example, when the ECU 30 performs a control routine exemplified in FIG. 6. A program of the control routine in FIG. 6 is retained in the ECU 30, is read out at an appropriate time, and is repeatedly executed at specified intervals.

In step S1, the ECU 30 determines presence or absence of a gear shift request of the downshifting or the upshifting to the automatic transmission 10. The presence or the absence of the gear shift request is determined when the ECU 30 refers to a control result of the gear shift control for the automatic transmission 10 that is executed in parallel with the control routine in FIG. 6. If the gear shift request is present, the process proceeds to step S2. If not, the following steps are skipped, and the current routine is terminated.

In step S2, the ECU 30 determines presence or absence of a rich spike execution request. If the rich spike execution request is present, the process proceeds to step S3. If not, the following processes are skipped, and the current routine is terminated.

In step S3, the ECU 30 determines whether a power running mode that is accompanied by the electric power discharge of the battery 7 is executed during the gear shift operation. The power running mode is executed in embodiments where the gear shift operation is downshifting. Thus, the ECU 30 determines whether the power running mode is executed by referring to a content of the gear shift request. If the power running mode is executed during the gear shift operation, the process proceeds to step S4. If the power running mode is not executed, that is, if a regeneration mode is executed, the process proceeds to step S7.

In step S4, the ECU 30 performs a determination process of determining whether a current period is an inertia-phase period. Whether a current phase is the inertia phase is determined by detecting the operation states of the clutches C1, C2 and the brakes B1, B2 of the automatic transmission 10 on the basis of hydraulic pressure of the each section of the unillustrated control valve that is provided in the automatic transmission 10. In step S5, the ECU 30 determines whether a current time point corresponds to the inertia phase. If the current time point does not correspond to the inertia phase, the process returns to step S4, and a determination process is continued. If the current time point corresponds to the inertia phase, the ECU 30 advances the process to step S6 and executes the rich spike in the inertia-phase period.

In step S7, the ECU 30 performs a determination process of whether the gear shift operation of the automatic transmission 10 is completed. Similar to the determination process in step S4, this determination process is executed by detecting the operation states of the clutches C1, C2 and the brakes B1, B2 of the automatic transmission 10 on the basis of the hydraulic pressure of the each section of the control valve. It is determined in step S8 whether the gear shift operation is completed. If the gear shift operation is not completed, the process returns to step S7, and the determination process is continued. If the gear shift operation is completed, the ECU 30 advances the process to step S6 and executes the rich spike after the gear shift operation is completed. Then, the current routine is terminated. The ECU 30 functions as an engine control means according to embodiments of the invention by executing the control routine in FIG. 6.

(Embodiments where Increase in Engine Power is Associated: Switching of Lean Combustion Operation→Stoichiometric Combustion Operation)

As described above, because the switching from a lean combustion operation to a stoichiometric combustion operation is executed on the basis of a temporal increase in the fuel amount, the switching is accompanied by an increase in the engine power. This switching is common to the execution of rich spike in such a point that the increase in the engine power is associated, and a content of a process that is executed in embodiments where this switching request and the gear shift request overlap is similar to a content of the above-described process that is executed during the execution of the rich spike. Accordingly, the content of this process becomes the same when portions of the "rich spike" in the above description and the flowchart in FIG. 6 are replaced by the "switching from the lean combustion operation to the stoichiometric combustion operation". For this reason, an overlapping description will not be included here.

(Embodiments where Reduction in Engine Power is Associated: Switching of Stoichiometric Combustion Operation-→Lean Combustion Operation)

Figure 7:
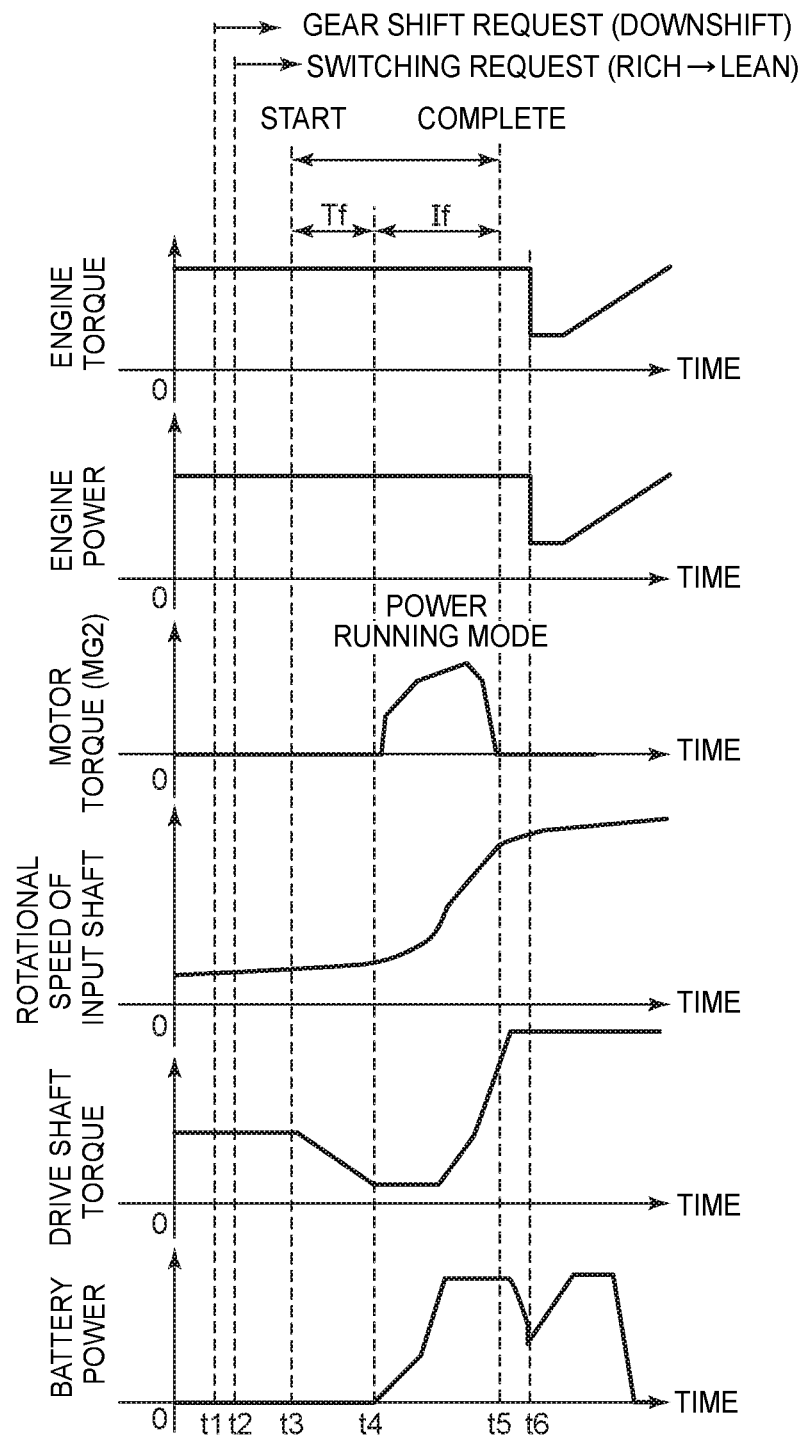
FIG. 7 is a timing chart of contents of control in embodiments where the gear shift request of the downshifting and a switching request from a stoichiometric combustion operation to a lean combustion operation overlap.

FIG. 7 shows a temporal change of each parameter where a gear shift request of the downshifting and a switching request from a stoichiometric combustion operation to a lean combustion operation overlap. In embodiments according to FIG. 7, the gear shift request of the downshifting is generated at a time t1, and the switching request from the stoichiometric combustion operation to the lean combustion operation is generated at a time t2. The interpretation on the overlapping of the two requests is the same as described above.

The gear shift operation is started at a time t3. In the gear shift operation, the disengagement operation of the clutches C1, C2 or the brakes B1, B2 becomes the start point in accordance with the gear shift pattern. Once the gear shift operation is started, the torque of the drive shaft 23 is reduced in the state where the rotational speed on the input side is substantially constant. The period from the time t3 at which the gear shift operation is started to a time t4 at which the reduction in the torque of the drive shaft 23 is stopped corresponds to a period of a torque phase Tf.

The period from the time t4 at which the period of the torque phase Tf ends to a time t5 at which the gear shift operation is completed corresponds to a period of an inertia phase If. Because an embodiment according to FIG. 7 is a case of the downshifting, a power running mode in which the second motor generator 4 is used to increase the rotational speed on the input side of the automatic transmission 10 is executed. The execution of the power running mode is started at the time t4 at which the inertia phase If is started, and the rotational speed on the input side is thereby increased. During this time, because the power running of the second motor generator 4 is executed by using the electric power of the battery 7, the battery power has a positive value meaning the electric power discharge, and the motor torque of the second motor generator 4 also has a positive value meaning the power running.

The switching from the stoichiometric combustion operation to the lean combustion operation is executed at a time t6 after the gear shift operation is completed. Because a reduction in the fuel amount, by which the air-fuel ratio is temporarily changed to the lean side, occurs by the execution of this switching, the engine torque and the engine power of the internal combustion engine 2 are both reduced stepwise. In synchronization with the switching of the operation mode, the power running of the second motor generator 4 is executed so as to compensate for the reduction in the engine torque and the engine power. In this way, the motor torque of the second motor generator 4 shows a positive value, and the battery power also shows a positive value.

In embodiments according to FIG. 7, the switching from the stoichiometric combustion operation to the lean combustion operation that is accompanied by the reduction in the engine power is executed after the gear shift operation is completed. If it is assumed that the switching is executed during the gear shift operation, the electric power that corresponds to a reduction amount of the engine power is added to the electric power that is consumed by the second motor generator 4 in the power running mode. Accordingly, the battery 7 is possibly overdischarged. In this embodiment, the switching from the stoichiometric combustion operation to the lean combustion operation that is accompanied by the reduction in the engine power is executed after the completion of the gear shift operation. Thus, discharging opportunities of the battery 7 by the execution of the power running mode are spread apart. More specifically, the discharging opportunities are spread to a period from the time t4 to the time t6 and a period from the time t6 onward. In this way, while the overdischarging of the battery 7 is avoided, the fluctuation in the output can be suppressed.

Figure 8:
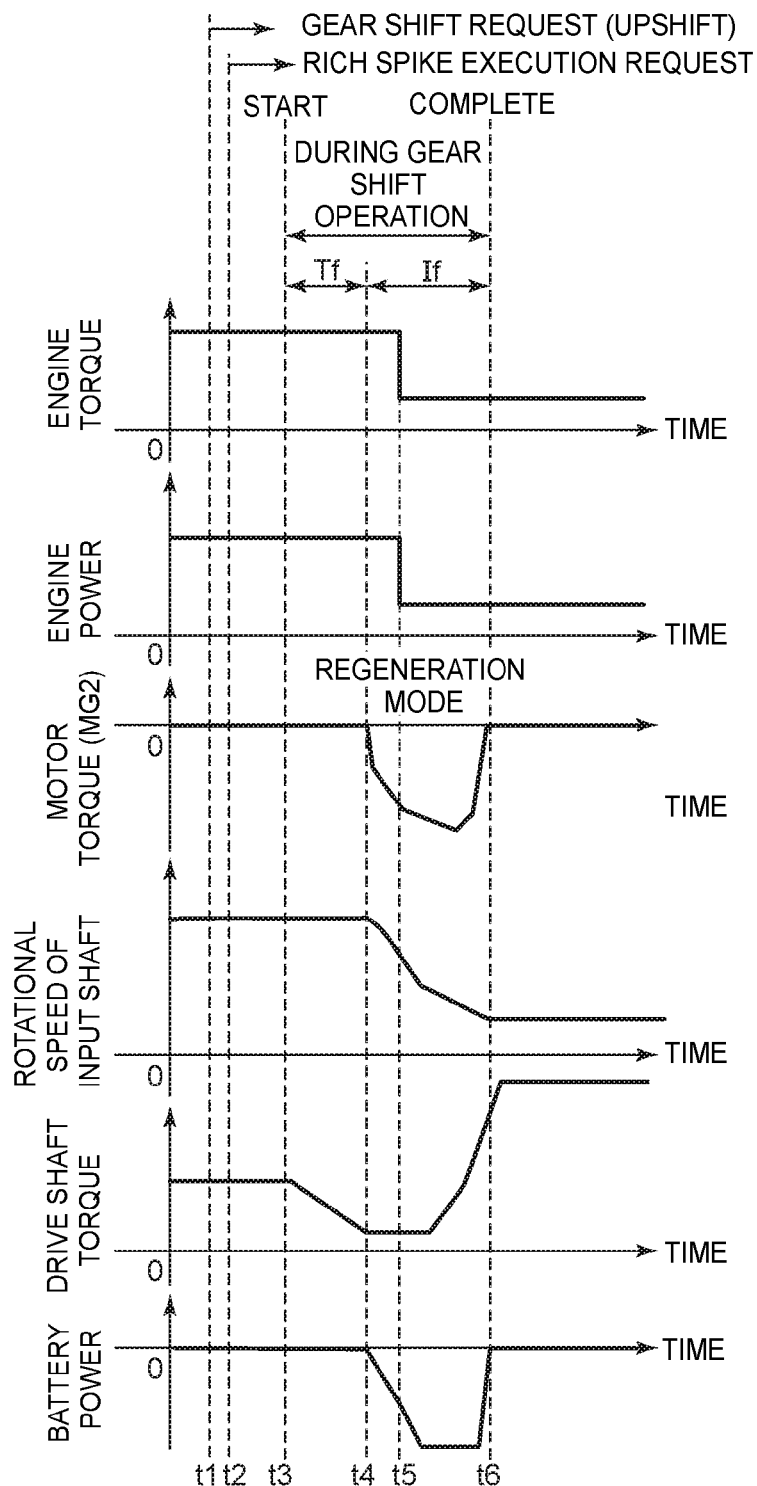
FIG. 8 is a timing chart of contents of control in embodiments where the gear shift request of the upshifting and the switching request from the stoichiometric combustion operation to the lean combustion operation overlap.

FIG. 8 shows a temporal change of each parameter where the gear shift request of the upshifting and the switching request from the stoichiometric combustion operation to the lean combustion operation overlap. In embodiments according to FIG. 8, the gear shift request of the upshifting is generated at a time t1, and the switching request from the stoichiometric combustion operation to the lean combustion operation is generated at a time t2. The interpretation on the overlapping of the two requests is the same as described above.

In embodiments according to FIG. 8, the gear shift operation is started at a time t3. In the gear shift operation, the disengagement operation of the clutches C1, C2 or the brakes B1, B2 becomes the start point in accordance with the gear shift pattern. Once the gear shift operation is started, the torque of the drive shaft 23 is reduced in a state where the rotational speed on the input side is substantially constant. A period from the time t3 at which the gear shift operation is started to a time t4 at which the reduction in the torque of the drive shaft 23 is stopped corresponds to a period of a torque phase Tf.

The period from the time t4 at which the period of the torque phase Tf ends to a time t6 at which the gear shift operation is completed corresponds to a period of an inertia phase If. Because an embodiment according to FIG. 8 is a case of the upshifting, a regeneration mode in which the second motor generator 4 is used to reduce the rotational speed on the input side of the automatic transmission 10 is executed. The execution of the regeneration mode is started at the time t4 at which the inertia phase If is started, and the rotational speed on the input side is thereby reduced. During this time, the regeneration control, for which the second motor generator 4 is used, is executed, and the battery 7 is charged with the electric power that is generated by the second motor generator 4. Thus, the battery power has a negative power meaning charging, and the motor torque of the second motor generator 4 also has a negative value meaning regeneration.

The switching from the stoichiometric combustion operation to the lean combustion operation is executed at a time t5 that is after the execution of the regeneration mode is started and that is in the period of the inertia phase If Because the reduction in the fuel amount, by which the air-fuel ratio is temporarily changed to the lean side, occurs by this switching, the engine torque and the engine power of the internal combustion engine 2 are both reduced stepwise. Thereafter, the gear shift operation is completed at the time t6, and the process is terminated.

In an embodiment according to FIG. 8, the switching from the stoichiometric combustion operation to the lean combustion operation that is accompanied by the reduction in the engine power is executed in the period of the inertia phase If Accordingly, because a power generation amount that is generated by the second motor generator 4 in the regeneration mode is reduced by the reduction amount of the engine power, the battery 7 is less likely to be overcharged. In addition, in the inertia phase If, a fluctuation in the engine torque is less likely to be transmitted as a fluctuation in the output in comparison with the torque phase Tf. Thus, while the overcharging of the battery 7 is avoided, the fluctuation in the output can be suppressed as much as possible.

Figure 9:
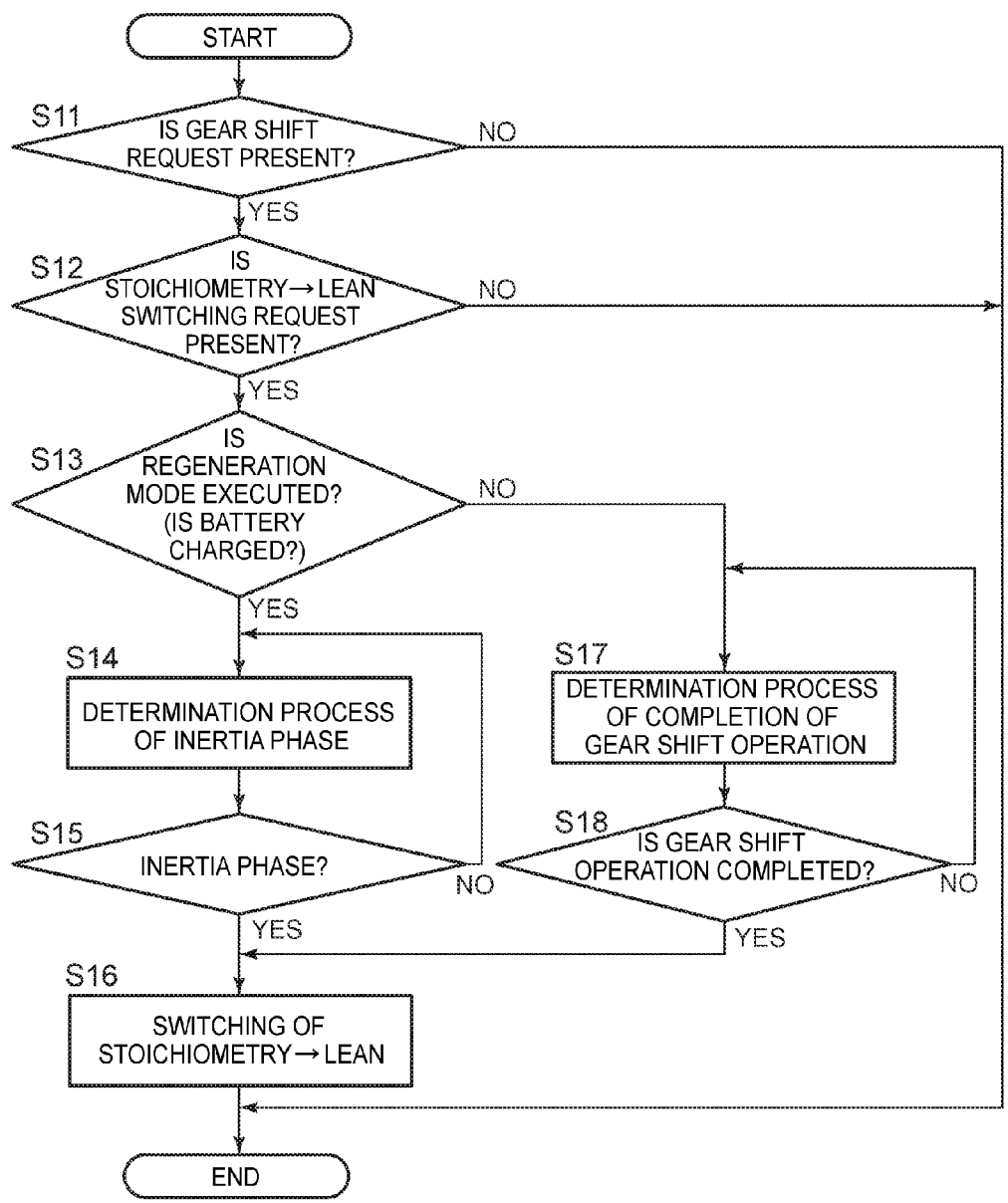
FIG. 9 is a flowchart of one example of a control routine where the gear shift request and the switching request from the stoichiometric combustion operation to the lean combustion operation overlap.

Each of the above-described control with respect to the power running mode and the regeneration mode in embodiments according to FIG. 7 and FIG. 8 can be realized, for example, when the ECU 30 performs a control routine exemplified in FIG. 9. A program of the control routine in FIG. 9 is retained in the ECU 30, is read out at appropriate time, and is repeatedly executed at specified intervals.

In step S11, the ECU 30 determines the presence or the absence of a gear shift request of the downshifting or the upshifting to the automatic transmission 10. The presence or the absence of the gear shift request is determined when the ECU 30 refers to a control result of the gear shift control for the automatic transmission 10 that is executed in parallel with the control routine in FIG. 9. If the gear shift request is present, the process proceeds to step S12. If not, the following processes are skipped, and the current routine is terminated.

In step S12, the ECU 30 determines the presence or absence of the switching request from a stoichiometric combustion operation to a lean combustion operation. If this switching request is present, the process proceeds to step S13. If not, the following processes are skipped, and the current routine is terminated.

In step S13, the ECU 30 determines whether a regeneration mode that is accompanied by the charging of the battery 7 is executed during the gear shift operation. The regeneration mode is executed in embodiments where the gear shift operation is the upshifting. Thus, the ECU 30 determines whether the regeneration mode is executed by referring to the content of the gear shift request. If the regeneration mode is executed during the gear shift operation, the process proceeds to step S14. If the regeneration mode is not executed, that is, if a power running mode is executed, the process proceeds to step S17.

In step S14, the ECU 30 performs a determination process of determining whether a current period is an inertia-phase period. Whether the period is the inertia phase or not is determined in a similar manner to what has been described above. In step S15, the ECU 30 determines whether a current time point corresponds to the inertia phase. If the current time point does not correspond to the inertia phase, the process returns to step S14, and the determination process is continued. If the current time point corresponds to the inertia phase, the ECU 30 advances the process to step S16 and executes the switching from the stoichiometric combustion operation to the lean combustion operation in the inertia-phase period.

In step S17, the ECU 30 performs the determination process for determining whether the gear shift operation of the automatic transmission 10 is completed. This determination process can be similar to the above. It is determined in step S18 whether the gear shift operation is completed. If the gear shift operation is not completed, the process returns to step S17, and the determination process is continued. If the gear shift operation is completed, the ECU 30 advances the process to step S16 and executes the switching from the stoichiometric combustion operation to the lean combustion operation after the gear shift operation is completed. Then, the current routine is terminated. The ECU 30 functions as an engine control means according to embodiments of the invention by executing the control routine in FIG. 9.

Embodiments of the invention are not limited to the above-described embodiments. In the above embodiments, both of the control in embodiments where the change of the combustion mode that is accompanied by the increase in the engine power and the gear shift request overlap (FIG. 4 to FIG. 6) and the control in embodiments where the change of the combustion mode that is accompanied by the reduction in the engine power and the gear shift request overlap (FIG. 7 to FIG. 9) are executed. However, embodiments of the invention can also be implemented in an embodiment in which either one of the above control is executed.

In addition, in the above embodiments, in order to suppress the increase in the engine power caused by the change of the combustion mode, control for reducing the torque of the internal combustion engine 2, such as the reduction in the intake air amount or the delaying of ignition, is not executed. However, embodiments of the invention can also be implemented in an embodiment in which execution of that type of control is permitted. Even in such embodiments, compared to embodiments of the invention where that control is not executed, there is an advantage that the fuel economy is improved because the reduction in the intake air amount can be reduced, and an ignition delay amount can be reduced.

The hybrid vehicle of the above embodiment is merely one example. A hybrid vehicle in which at least one motor generator is provided on an upstream side of an automatic transmission and that has a configuration of capable of suppressing the fluctuation in the output that is associated with the gear shift operation by operating the motor generator in the operation mode of either the power running mode or the regeneration mode is another embodiment of the invention.

The change of the combustion mode is not limited to the switching of the operation mode between the rich spike or the stoichiometric combustion operation and the lean combustion operation that has been exemplified in the above embodiment. As long as the change of the air-fuel ratio with respect to the internal combustion engine is involved, this change corresponds to the change of the combustion mode, and thus, embodiments of the invention can be applied thereto.

The transmission mechanism is not limited to the automatic transmission referred to in the above embodiments. As long as the transmission mechanism is a type that selectively establishes plural gear stages and in which a torque phase and an inertia phase are present, the transmission mechanism can an embodiment of the invention. Not only an automatic transmission that uses a planetary gear unit, but also a hybrid vehicle that is provided with an automated manual transmission (AMT) as the transmission mechanism, in which an input shaft and an output shaft are arranged in parallel and in which a selection operation of a gear pair and a clutch operation are automated by an actuator, can be an embodiment of the invention.

What is claimed is:

1. A control system for a hybrid vehicle, the hybrid vehicle including an internal combustion engine, a battery, a motor generator, and a transmission mechanism, the internal combustion engine capable of changing a combustion mode accompanied by a change of an air-fuel ratio, the motor generator electrically connected to the battery, the internal combustion engine and the motor generator provided on an input side of the transmission mechanism, the control system comprising:
an electronic control unit configured to be able to selectively execute a power running mode in which power running of the motor generator is executed by using electric power of the battery and a regeneration mode in which regeneration control is executed in the motor generator so as to charge the battery, the electronic control unit configured to execute a change of the combustion mode in an inertia-phase period during a gear shift operation or after the gear shift operation is completed where a request for the change of the combustion mode and a request for a gear shift of the transmission mechanism overlap, the electronic control unit configured to execute the change of the combustion mode in the inertia-phase period during the gear shift operation where the following conditions i) and ii) are established, and the electronic control unit configured to execute the change of the combustion mode after the gear shift operation is completed where the following conditions i) and iii) are established:
i) the change of the combustion mode is accompanied by an increase in engine power;
ii) the power running mode is executed during the gear shift operation; and
iii) the regeneration mode is executed during the gear shift operation.

2. The control system according to claim 1, wherein the electronic control unit is configured to execute the change of the combustion mode without controlling engine torque in a direction to compensate for the increase in engine power by the change of the combustion mode.

3. The control system according to claim 1, wherein
a stoichiometric combustion operation is an operation of the internal combustion engine in which a theoretical air-fuel ratio and an air-fuel ratio near the theoretical air-fuel ratio are set as targets,
a lean combustion operation is an operation of the internal combustion engine in which an air-fuel ratio that is on a leaner side than the targets of the stoichiometric combustion operation is set as a target,
a lean burn engine is an internal combustion engine configured such that rich spike for temporarily changing the air-fuel ratio to a rich side during the lean combustion operation is executed,
the internal combustion engine is configured to be able to switch between the stoichiometric combustion operation and the lean combustion operation, the internal combustion engine being the lean burn engine, and
the change of the combustion mode that is accompanied by the increase in the engine power corresponds to switching from the lean combustion operation to the stoichiometric combustion operation or execution of the rich spike.

4. The control system according to claim 1, wherein
the electronic control unit is configured to execute the change of the combustion mode after the gear shift operation is completed where the following conditions iv) and v) are established, and the electronic control unit is configured to execute the change of the combustion mode in the inertia-phase period during the gear shift operation where the following conditions iv) and vi) are established:
iv) the change of the combustion mode is accompanied by a reduction in the engine power;
v) the power running mode is executed during the gear shift operation; and
vi) the regeneration mode is executed during the gear shift operation.

5. The control system according to claim 4, wherein
a stoichiometric combustion operation is an operation of the internal combustion engine in which a theoretical air-fuel ratio and an air-fuel ratio near the theoretical air-fuel ratio are set as targets,
a lean combustion operation is an operation of the internal combustion engine in which an air-fuel ratio that is on a leaner side than the targets of the stoichiometric combustion operation is set as a target,
a lean burn engine is an internal combustion engine configured such that rich spike for temporarily changing the air-fuel ratio to a rich side during the lean combustion operation is executed,
the internal combustion engine is configured to be able to switch between the stoichiometric combustion operation and the lean combustion operation, the internal combustion engine being the lean burn engine,
the change of the combustion mode that is accompanied by the increase in the engine power corresponds to switching from the lean combustion operation to the stoichiometric combustion operation or execution of the rich spike, and
the change of the combustion mode that is accompanied by the reduction in the engine power corresponds to switching from the stoichiometric combustion operation to the lean combustion operation.

6. A control system of a hybrid vehicle, the hybrid vehicle including an internal combustion engine, a battery, a motor generator, and a transmission mechanism, the internal combustion engine capable of changing a combustion mode accompanied by a change of an air-fuel ratio, the motor generator electrically connected to the battery, the internal combustion engine and the motor generator provided on an input side of the transmission mechanism, the control system comprising:
an electronic control unit configured to be able to selectively execute a power running mode in which power running of the motor generator is executed by using electric power of the battery and a regeneration mode in which regeneration control is executed in the motor generator so as to charge the battery, the electronic control unit configured to execute a change of the combustion mode in an inertia-phase period during a gear shift operation or after the gear shift operation is completed where a request for the change of the combustion mode and a request for gear shift of the transmission mechanism overlap, the electronic control unit configured to execute the change of the combustion mode after the gear shift operation is completed where the following conditions i) and ii) are established, and the electronic control unit configured to execute the change of the combustion mode in the inertia-phase period during the gear shift operation where the following conditions i) and iii) are established:

i) the change of the combustion mode is accompanied by a reduction in engine power;

ii) the power running mode is executed during the gear shift operation; and iii) the regeneration mode is executed during the gear shift operation.

7. The control system according to claim 6, wherein a stoichiometric combustion operation is an operation of the internal combustion engine in which a theoretical air-fuel ratio and an air-fuel ratio near the theoretical air-fuel ratio are set as targets, a lean combustion operation is an operation of the internal combustion engine in which an air-fuel ratio that is on a leaner side than the targets of the stoichiometric combustion operation is set as a target, a lean burn engine is an internal combustion engine configured such that rich spike for temporarily changing the air-fuel ratio to a rich side during the lean combustion operation is executed, the internal combustion engine is configured to be able to switch between the stoichiometric combustion operation and the lean combustion operation, the internal combustion engine being the lean burn engine, and the change of the combustion mode that is accompanied by the reduction in the engine power corresponds to switching from the stoichiometric combustion operation to the lean combustion operation.

* * * * *